Figure 10:
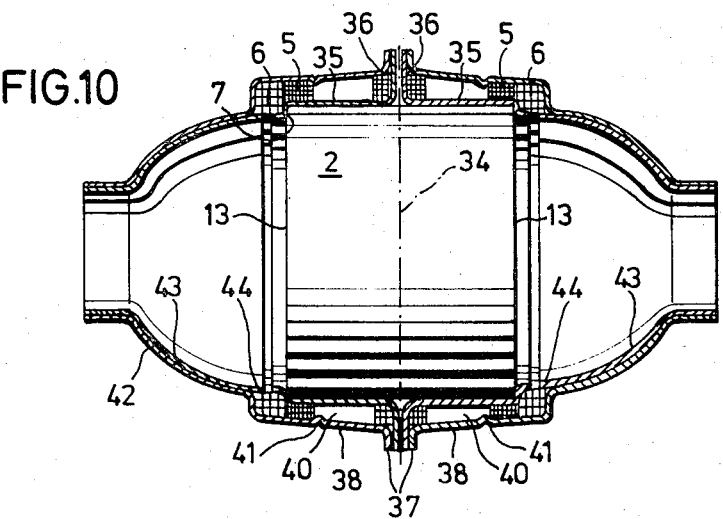

United States Patent [19]
Frietzsche et al.

[11] 3,854,888
[45] Dec. 17, 1974

[54] DEVICE FOR THE PURIFICATION OF WASTE GASES OF INTERNAL COMBUSTION ENGINES

[75] Inventors: Gunther Frietzsche; Peter Krause, both of Edenkoben, Germany

[73] Assignee: Paul Gillet GMBH, Edenkoben/Pfalz, Germany

[22] Filed: Aug. 27, 1973

[21] Appl. No.: 391,536

[30] Foreign Application Priority Data
Sept. 2, 1972  Germany.......................... 2243251

[52] U.S. Cl. .................... 23/288 F, 55/482, 55/502
[51] Int. Cl. ........................................... B01j 9/04
[58] Field of Search ............ 55/482, 485, 498, 500, 55/502, 504, 510, DIG. 30; 23/277 C, 288 F

[56] References Cited
UNITED STATES PATENTS
| | | | |
|---|---|---|---|
| 3,248,188 | 4/1966 | Chute | 55/DIG. 30 |
| 3,656,784 | 4/1972 | Dow et al. | 285/302 |
| 3,692,497 | 9/1972 | Keith et al. | 55/DIG. 30 |

*Primary Examiner*—Bernard Nozick
*Attorney, Agent, or Firm*—Robert H. Jacob

[57] ABSTRACT

Device for the purification of waste gases of internal combustion engines in a housing having at least one monlith through which the waste gases flow in the housing, the monolith having end edges and one compressed steel body ring absorbing radial forces and a compressed steel body ring absorbing axial forces, where the rings are disposed at the end edges and supporting and protecting rings of thin sheet metal are disposed between the rings and the end edges.

11 Claims, 14 Drawing Figures

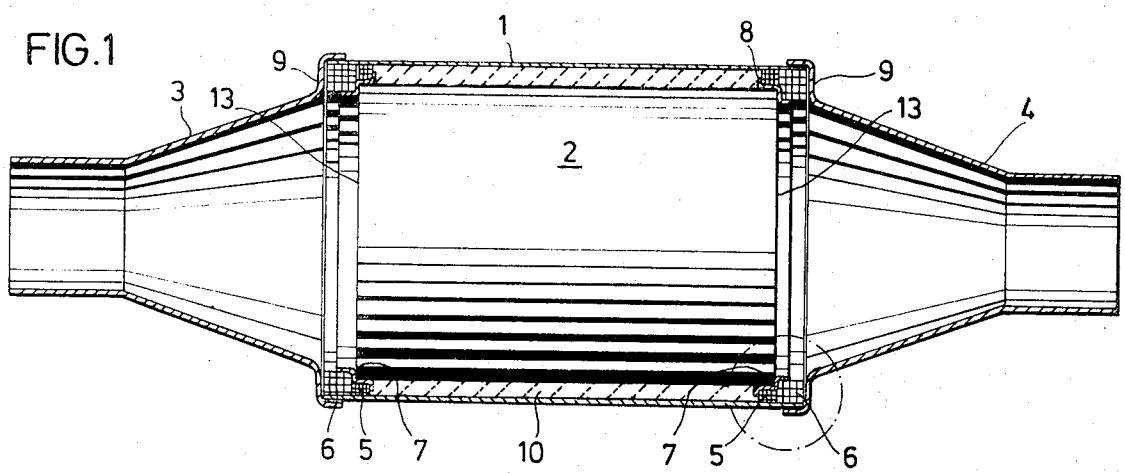
FIG.1
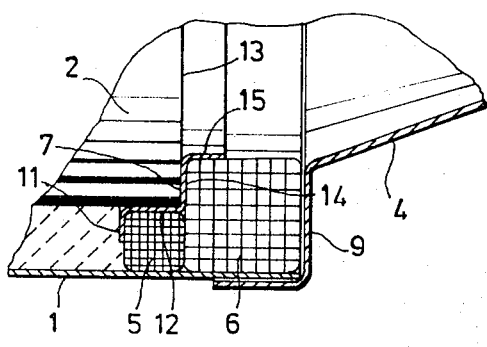
FIG.2
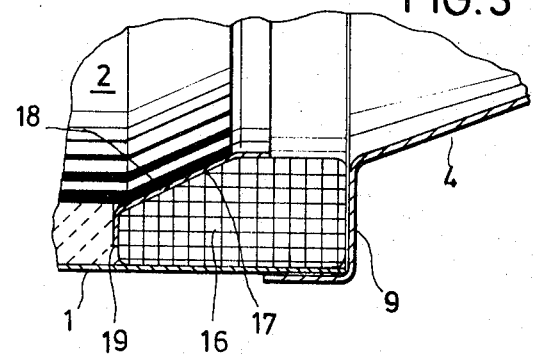
FIG.3
FIG.4
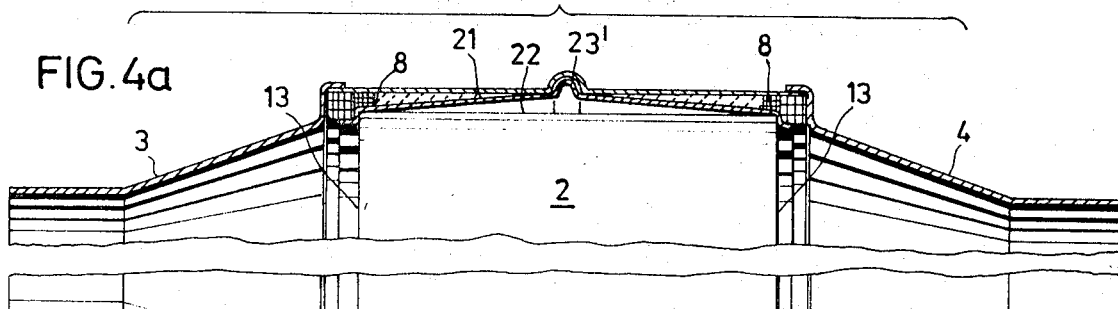
FIG.4a
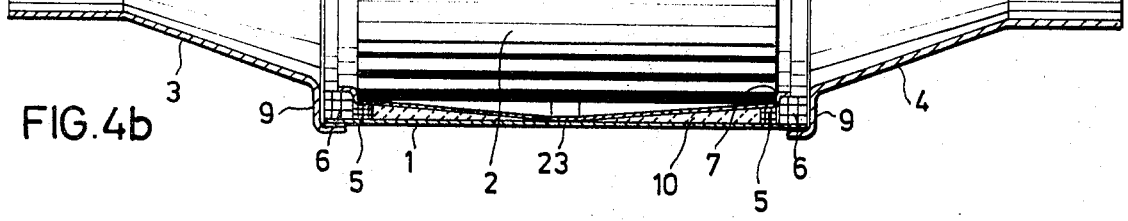
FIG.4b

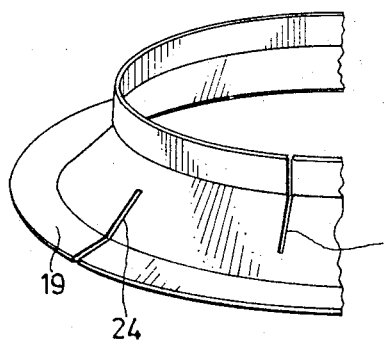
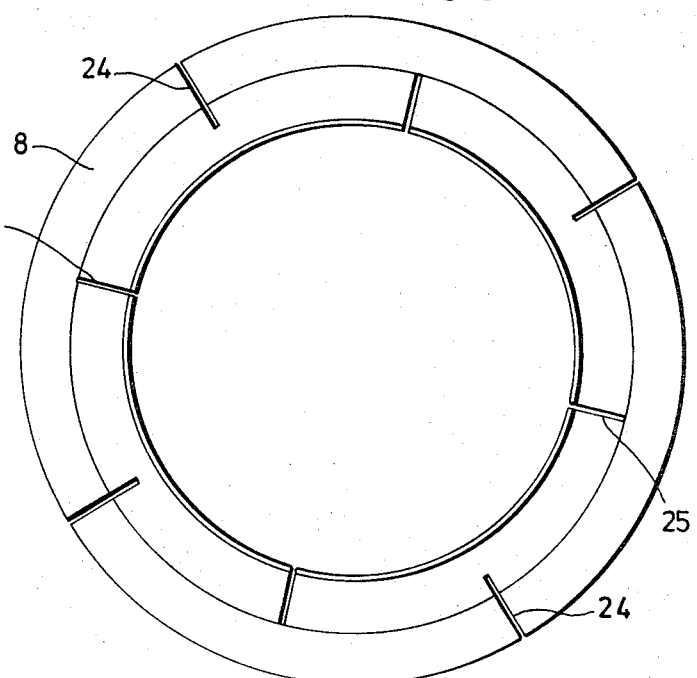
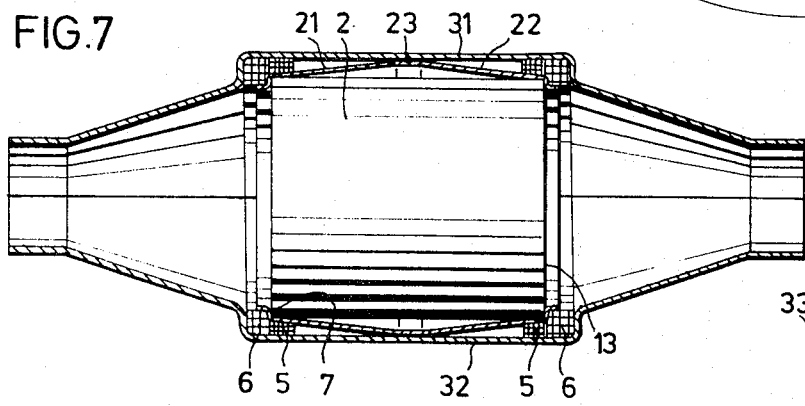
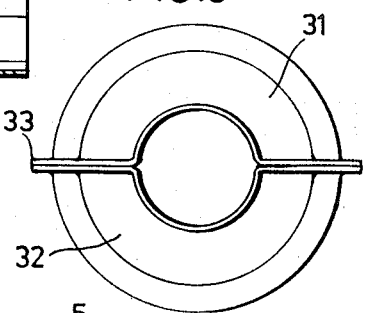
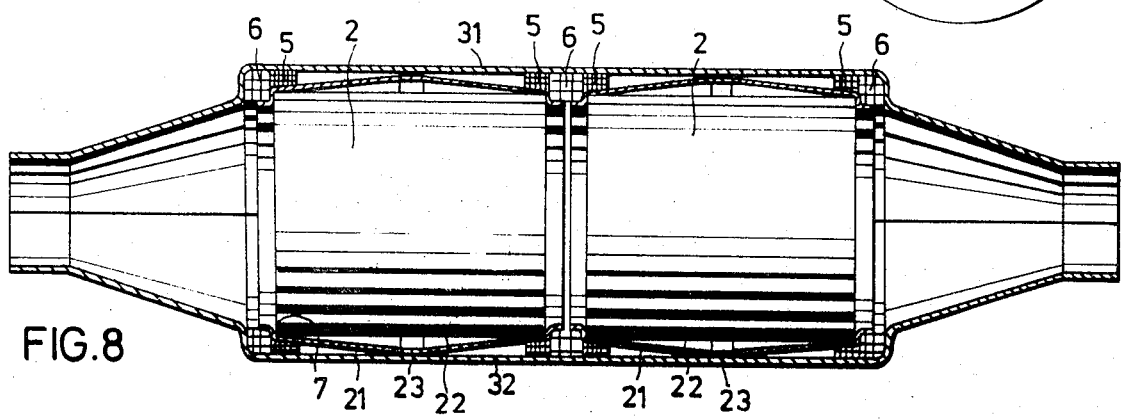

DEVICE FOR THE PURIFICATION OF WASTE GASES OF INTERNAL COMBUSTION ENGINES

The invention relates to devices for the purification of waste gases of internal combustion engines and is particularly concerned with devices that are equipped with so-called monoliths, i.e., ceramic bodies that serve as carriers for the necessary catalysts. Devices of this type are as a rule connected in their own housings ahead of the conventional mufflers in waste gas conduits of combustion engines. The monoliths are relatively sensitive against mechanical influences so that special efforts are required to discover unobjectionable supporting means for them in the housing that surrounds them. The construction of the supporting means in turn introduces problems in the entire structural assembly of the device, particularly if it is taken into account that a mass product is concerned where there exist requirements for the course of production, if it is furthermore considered that the device is subjected during operation to extremely high mechanical demands when installed in power driven vehicles which result in vibration shocks that occur during driving, while on the other hand they are caused by the effects of the gas stream pulsating at high frequencies which has to be conducted through the device. In the same manner the monolith and the housing are subjected to very high temperature loads and oscillations depending on the occurrence of CO parts which burn subsequently, and depending on the load to which the motor is subjected, very high temperature increases can take place up to above 1000°C.

Accordingly efforts have already been made to find solutions, particularly for the mounting of the monolith in the surrounding housing, which are intended to prevent rapid destruction of the monolith during operation. In accordance with published German specification No. 1,476,507 it is proposed to surround the monolith with a cover of corrugated material either of corrugated sheet metal, or of undulated mesh screen and to support the entire structure at both ends by means of inwardly directed flanges of the outer housing.

By these means a sufficiently elastic bearing and support of the monolith in radial direction is safely accomplished. The forces acting on the monolith however are oriented in axial direction. They originate essentially from the stream of waste gases which flows through the monolith in anxial direction. In this connection it must be considered above all that this high frequency pulsating waste gas stream passes again and again through areas in which resonances of the device arise in the mechanical parts in which it also may come to a standstill. Finally, it must be considered that the device is subjected to changing temperatures within a very broad temperature range and the coeffecient of expansion of the monolith consisting of ceramic material which is determined by the temperature is at a substantial distance of that which surrounds the metallic parts of the device.

Accordingly it is an object of the invention to provide means and ways which safeguard the supporting of the monolith in the device that are sufficient to cope with the considerable requirements resulting from the above described circumstances. In addition, it must be considered that although this journalling completely meets the requirements which must be met with a real mass product, it must be taken into consideration that the sensitivity of the monolith can result in damages not only in operation but already during the manufacture of the device.

It is an object of the invention to solve this problem by means of a device for cleaning waste gases of internal combustion engines having one or several monoliths journalled in a housing, that the monolith or monoliths are supported at the areas of their front and rear edges by a ring of pressed bodies of steel wire that absorbs the radial forces and a further ring that absorbs the axial forces.

In a simple manner these pressed steel wire bodies may consist of compressed steel wool or wool of refined steel. Rings of refined steel netting however have proven to be of particular advantage.

To an extent these rings are softly elastic, they have sufficient inherent resiliency so that above all the dangerous resonance phenomona that lead to rapid destruction of the monolith are avoided.

In lieu of two individual rings for the radial support on the one hand and for the axial support on the other hand it is also possible to provide a single ring which has an oblique inner side that absorbs the forces in both directions which involves the requisite to have a suitably inclined front end edge.

The basic arrangement of the monolith journalling must be supported by supporting and protecting rings of thin sheet metal which are disposed about the terminal edges of the monolith and which extend also axially with suitable flanges at least over a part of the associated steel wire ring surfaces. These rings prevent reliably the chafing of the monolith by the individual wires of the steel wire ring. Furthermore they take care of even transfer of the bearing forces onto the entire circumference of the monolith. For improvement of the transfer of forces, it is furthermore provided that small gaps between the surface of the monolith and the slit of protective rings can be balanced out by a fire resisting or refractory cement.

Preferably the ring is frequently interrupted about its scope or circumference by radially directed slots so that in no area of the ring there develops a fibrous region that extends over its entire circumference. These means make it best to exceed the extremely different coefficient heat between the monolith on the one hand and the metallic bearings or the other hand.

It is possible to widen the supporting and protecting ring to a mantle encompassing the monolith over its entire length. If one begins with a longitudinally divided housing consisting of two half shells (this form of embodiment is especially suitable with refined steel housings), this mantle can then form the monolith circumference at its central area to the inner diameter of the housing with increasing conical shape. It then supports itself at the central area of the housing and prevents above all a partial gas stream between monolith and housing. The two shell halves may then be welded together in a known manner or may also be crimped while a sealing agent is introduced.

In a different embodiment with a housing which extends from two or more annular areas with connecting flanges extending in a radial plane, the supporting and protecting rings that extend toward the mantle may be adapted in shape to these housing parts so that a connection of the housing flange may simultaneously be made with a connection of corresponding flanges of the protective cover parts, particularly by welding.

The housing parts here are preferably slightly conical in order to enable mounting the steel wire rings by using relatively small pressure forces. If necessary light inwardly pressed annular beads are provided for the final supporting of the steel wire rings in the housing.

With the embodiment last described, an absolute sealing of the annular space between monolith and housing against partial gas streams is obtained. Thus, it is not necessary here to provide for the usual filling of this annular space with mineral wool, for example basalt wool.

Figure 11:
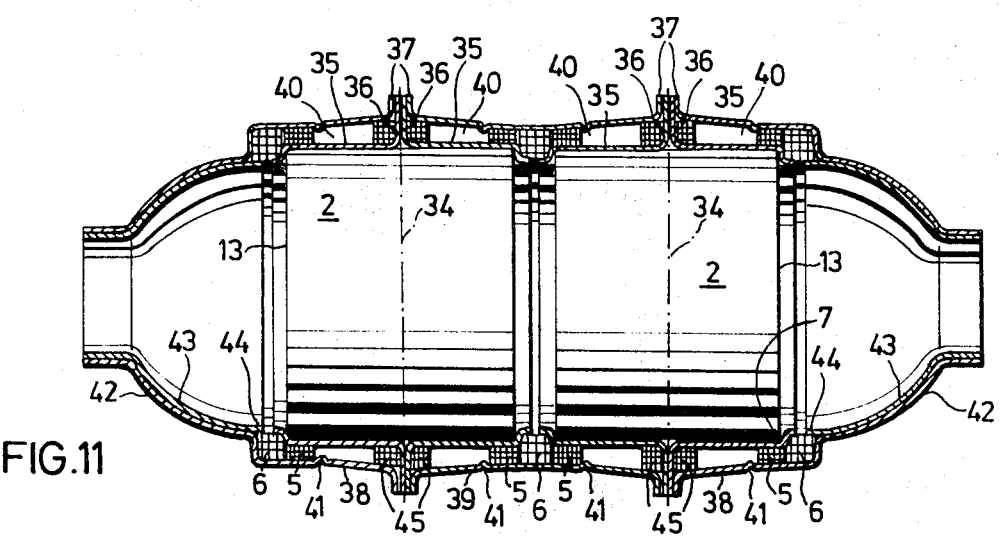
Figure 12:
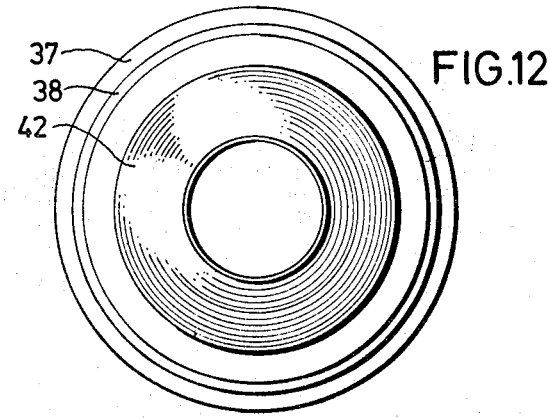

Further features of the invention, as well as the advantages obtained thereby will appear from the following specification of different embodiments of the subject of the application illustrated in the accompanying drawings, in which FIG. 1 illustrates in a longitudinal section a basic form of the device in accordance with the invention, FIG. 2 shows to an enlarged scale the area which in FIG. 1 is enclosed by a dot and dash ring, FIG. 3 shows the same area but with a different embodiment of the bearing, FIG. 4, 4a and 4b shows another varied embodiment of the device, again in section, FIG. 5 is a plan view of the supporting and protecting ring, FIG. 6 is an illustration of one-half of a ring of a different embodiment, FIG. 7 is an embodiment corresponding essentially to FIG. 4, but with the housing divided longitudinally in two half shells, FIG. 8 is an embodiment with two built-in monoliths, FIG. 9 is an end view of FIGS. 7 and 8, FIGS. 10 and 11 show a modified embodiment with one, or again two monoliths, FIG. 12 finally is a front view of the two embodiments.

In a housing 1 a monolith 2 of circular cylinder shape is accommodated and journalled. This housing 1 continues at both ends in extensions 3 and 4 of frustoconical shape that taper down to a tubular diameter.

For the unobjectional journalling of monolith 2 in the housing 1 in radial as well as axial direction, there are rings of pressed wire, preferably of fine steel wire mesh, where the rings 5 take on the radial, and rings 6 the axial journalling. Between the edges of the ends 7 of the monolith 1 and the steel rings 5 and 6, supporting and protecting rings 8 of thin sheet metal are provided.

The thickness of the sheet metal and the sheet metal material are here so chosen that the ring is to an extent elastic and deformable.

In the embodiment shown in FIG. 1 the extensions 3 and 4 are provided with radially outwardly extending flanges 8 which serve as bearings for the rings 6 in axial direction.

The annular space formed between housing 1 and monolith 2 is filled with mineral wool, for example basalt wool.

The supporting ring 8 may be cemented on to the area of the end edges 7 of the monolith 2 by means of a special cement. This provides above all that in the production there already is protection against damages for this sensitive edge area.

The supporting and protecting ring 8 has four areas as shown particularly in FIG. 2. First, it has a radially directed flange 11 which part covers the side of the steel wire ring 5 that faces it, then it continues into a cylindrically shaped area 12 which encompasses the monolith 2, then again following the end 13 of the monolith 2 extends with its area 14 radially inwardly and finally terminates in a circularly, cylindrically, axially extending flange 15 which in turn partly covers the pressed wire body 6 and provides for internal radial centering.

In lieu of the two rings 5 and 6, it is also possible to provide a single ring 16 which has an oblique inner surface 17 that cooperates with a correspondingly oblique front end edge area 18 of the monolith 2. In this embodiment the single steel wire ring 16 may absorb axial, as well as radial forces.

The supporting and protecting ring 19 is, of course, adapted in shape to the form of the steel wire ring 16 and monolith 2.

The supporting and protecting ring may be substituted by a mantle 21 as illustrated in FIG. 4 and which completes the mantle surface 22 of the monolith 2. If this mantle 21 is furthermore expanded in frustoconical shape to the inner diameter of the housing 1, it can support itself there first against the housing and prevents in second place a partial gas stream through the annular space 10 so that then the filling thereof by means of mineral wool or the like can be omitted. In the central area 23 mantle 21 can be welded to the outer mantle 1 of the housing. A further embodiment provides for having an annular bead 23' on the outer mantle 1 and there to introduce additionally a radial and axial support of the mantle 21.

The supporting and protecting ring 8 or 19 has distributed over its circumference radially extending slots 24 and 25 which prevent that in no area of the ring there exists a through-going annular fiber area. It is, of course, also possible to provide these slots on the mantle 21.

Especially where the housing of the device is made of refined steel, it will be advantageous to construct the same out of two half shells 31 and 32 which are connected by means of a longitudinal flange 33. It is then possible in a particularly simple manner to introduce the parts of the internal fitting into the housing no matter whether a monolith 2 is provided in accordance with FIG. 7 or two or more monolits in accordance with FIG. 8.

If it is desired that a partial gas stream is to be completely eliminated in the annular space between the housing and the monolith 2, the form of construction of the housing and its inner fitting may be effected in accordance with FIGS. 10 and 11. Here the supporting and protecting rings of the monolith are expanded to partial mantles 35 encompassing the central radial plane which have flange 36 which together with flanges 37 of housing parts 38 and 39 may be connected particularly by welding. Also here filling of the annular space 40 is superfluous. The layer of air remaining here provides for heat insulation.

The housing parts 38 and 39 may advantageously be of conical shape. This then provides the possibility of easier assembly of the internal fitting. The steel wire rings 5 are inserted under light pressure. If desired the housing may be provided with small inwardly directed annular beads 41 which the retain the rings 5 in their end positions.

Finally, it is also possible to make the extensions 42 of the housing with double walls while at least the inner wall may be of refined steel and this inner wall 43 is then somewhat extended at 44 over the steel wire rings 6.

In the corner area between the partial mantles 35 and their flanges 36 additional steel wire rings 45 may be provided for support.

Having now described our invention with reference to the embodiments illustrated in the drawings, we do not wish to be limited thereto, but what we desire to protect by letters patent is set forth in the appended claims.

We claim:

1. Device for the purification of waste gases of internal combustion engines comprising a housing having an inlet and an outlet and having at least one monolith through which the waste gases flow and which is disposed in said housing between said inlet and outlet, said at least one monolith having opposed end edges and having one compressed steel body ring in contact with the side portions of the end edges absorbing radial forces and one compressed steel body ring in contact with the end portions of the end edges absorbing axial forces, said rings being disposed at said end edges on contact with the housing, and supporting and protecting rings of thin sheet metal disposed between and in contact with said rings and said end portion edges.

2. Device in accordance with claim 1 where the rings in the form of compressed steel bodies comprise refined steel wool.

3. Device in accordance with claim 1 where the rings in the form of compressed steel bodies comprise refined steel wire netting.

4. Device in accordance with claim 3 comprising a single ring in lieu of two individual rings having an inclined inner side cooperating with a correspondingly inclined end edge of the monolith which absorb the axial as well as the radial forces.

5. Device in accordance with claim 1 where the supporting and protecting rings are repeatedly interrupted circumferentially by radially directed slots in a manner that in no area of the rings there remains a fibrous area passing over the circumference.

6. Device in accordance with claim 5 where the supporting and protecting ring is enlarged in the direction of the mantle plane of the monolith.

7. Device in accordance with claim 6, characterized in that the supporting and protecting ring is widened to form a mantle extending over the total length of the monolith and is increasingly conically shaped from the circumference of the monolith to the inner diameter of the housing.

8. Device in accordance with claim 6 where the supporting and protecting ring extends to the central radial plane of the monolith and is provided there with an outwardly extending flange.

9. Device in accordance with claim 8 where the housing parts widen conically outwardly toward the connecting flange disposed in the central radial plane of the monolith.

10. Device in accordance with claim 9 where the ring is of wire netting and proximate the position of the ring the housing has an inwardly extending annular bead.

11. Device in accordance with claim 10 where the supporting and protecting ring is mounted in the area of the end edge of the monolith and a special cement is interposed between the monolith and the ring.

* * * * *

UNITED STATES PATENT OFFICE
CERTIFICATE OF CORRECTION

Patent No. 3,854,888         Dated December 17, 1974

Inventor(s) Gunter Frietzsche, Peter Krause

It is certified that error appears in the above-identified patent and that said Letters Patent are hereby corrected as shown below:

Claim 1, line 11, the word "on" should be changed to --in--.

Signed and Sealed this

Third Day of August 1976

[SEAL]

Attest:

RUTH C. MASON
*Attesting Officer*

C. MARSHALL DANN
*Commissioner of Patents and Trademarks*

Notice of Adverse Decision in Interference

In interference No. 100,898, involving Patent No. 3,854,888, G. Frietzsche and P. Krause, DEVICE FOR THE PURIFICATION OF WASTE GASES OF INTERNAL COMBUSTION ENGINES, final judgment adverse to the patentees was rendered Apr. 1, 1983, as to claims 1 and 3.

[*Official Gazette July 12, 1983.*]